United States Patent
Costin et al.

(10) Patent No.: US 7,600,161 B2
(45) Date of Patent: Oct. 6, 2009

(54) METHOD OF VERIFYING INTEGRITY OF CONTROL MODULE ARITHMETIC LOGIC UNIT (ALU)

(75) Inventors: Mark H. Costin, Bloomfield Township, MI (US); Timothy J. Hartrey, Brighton, MI (US); Tyrus J. Valascho, Clarkston, MI (US); Steven P. Sullivan, Ann Arbor, MI (US); William Robert Mayhew, Ann Arbor, MI (US); Ananth Krishnan, Ypsilanti, MI (US); Jinchun Peng, Westland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 540 days.

(21) Appl. No.: 10/918,621

(22) Filed: Aug. 13, 2004

(65) Prior Publication Data

US 2006/0036911 A1     Feb. 16, 2006

(51) Int. Cl.
 *G06F 11/00* (2006.01)
(52) U.S. Cl. .................. 714/100; 714/720; 714/722
(58) Field of Classification Search ............... 714/735, 714/720, 722, 100, 25
See application file for complete search history.

(56) References Cited

U.S. PATENT DOCUMENTS

| | | | | |
|---|---|---|---|---|
| 3,883,801 A | * | 5/1975 | Hess | 714/736 |
| 4,313,200 A | * | 1/1982 | Nishiura | 714/736 |
| 4,339,801 A | * | 7/1982 | Hosaka et al. | 701/102 |
| 4,532,594 A | * | 7/1985 | Hosaka et al. | 701/114 |
| 4,618,956 A | * | 10/1986 | Horst | 714/37 |
| 4,905,183 A | * | 2/1990 | Kawaguchi et al. | 712/19 |
| 5,469,443 A | * | 11/1995 | Saxena | 714/720 |
| 5,541,936 A | * | 7/1996 | Tanaka | 714/736 |
| 5,619,512 A | * | 4/1997 | Kawashima et al. | 714/733 |
| 5,677,913 A | * | 10/1997 | Aybay | 714/720 |
| 5,954,831 A | * | 9/1999 | Chang | 714/720 |
| 5,991,898 A | * | 11/1999 | Rajski et al. | 714/30 |
| 6,098,182 A | * | 8/2000 | Cowan | 714/25 |
| 6,427,160 B1 | * | 7/2002 | Parks et al. | 708/530 |
| 2002/0019928 A1 | * | 2/2002 | Saulsbury | 712/222 |

FOREIGN PATENT DOCUMENTS

JP        59033700 A  *  2/1984

OTHER PUBLICATIONS

Computer Organization & Design: The Hardware/Software Interfaceb by Patterson and Hennessy Published by Morgan Kaufmann Publishers, Inc. 1997 Attached pp: title sheet, 107,140, 141.*

(Continued)

*Primary Examiner*—Scott T Baderman
*Assistant Examiner*—Joseph Schell

(57) ABSTRACT

A method of verifying the integrity of an arithmetic logic unit (ALU) of a control module includes inputting a first test value into one of a plurality of registers of the ALU and inputting a second test value into remaining registers of the plurality of registers. A first set of operations is performed between the one of the plurality of registers and each of the remaining registers to produce a first set of results. A fault is indicated when one of the first set of results varies from a first predetermined result.

32 Claims, 8 Drawing Sheets

OTHER PUBLICATIONS

Programming Embedded Systems in C and C++ by Michael Barr Published by O'Reilly, Jan. 1, 1999 Print ISBN-10: 1-565-92354-5.*
Deriving the XOR Function version from Oct. 13, 1999, found via the WayBack Machine http://web.archive.org/web/19991013054720/http://play-hookey.com/digital/xor_function.html.*

Efficient algorithms for microprocessor testing by Joshi and Hosseini Annual Reliability and Maintainability Symposium, 1998. Proceedings., Jan. 19-22, 1998 ISBN: 0-7803-4362-X.*

* cited by examiner

METHOD OF VERIFYING INTEGRITY OF CONTROL MODULE ARITHMETIC LOGIC UNIT (ALU)

FIELD OF THE INVENTION

The present invention relates to control modules, and more particularly to a method of verifying the integrity of an arithmetic logic unit (ALU) of a control module.

BACKGROUND OF THE INVENTION

Control modules are implemented in a variety of systems to process data and provide control signals. For example, vehicle control modules generate control signals that direct the operation of vehicle components. The control module receives signals from various sensors and other devices that monitor operating characteristics (e.g., engine speed, temperature, pressure, gear ratio and the like). The control signals are based on the signals received from the various sensors. More particularly, the control module processes signal information using an arithmetic logic unit (ALU). The control module processes the control signals based on a pre-programmed control strategy.

In some applications, control modules generate safety critical control signals. That is to say, the control signals direct component operation that can effect vehicle performance. For example, in a vehicle having a shift-by-wire system, the control module generates control signals that regulate shifting of a transmission. Inaccuracy in the control signals can result in damage to the components of the transmission and/or improper operation of the transmission.

A defective ALU and/or memory registers can effect control signal accuracy. Therefore, integrity checks have been developed to determine whether the ALU and/or memory registers are functioning properly. Traditional ALU integrity checks, however, fail to check all operations that the ALU performs.

SUMMARY OF THE INVENTION

Accordingly, the present invention provides a method of verifying the integrity of an arithmetic logic unit (ALU) of a control module. The method includes inputting a first test value into one of a plurality of registers of the ALU and inputting a second test value into remaining registers of the plurality of registers. A first set of operations is performed between the one of the plurality of registers and each of the remaining registers to produce a first set of results. A fault is indicated when one of the first set of results varies from a first predetermined result.

In other features, the method further includes inputting the first test value into the remaining registers and performing a second set of operations between the one of the plurality of registers and each of the remaining registers to produce a second set of results. A fault is indicated when one of the second set of results varies from a second predetermined result.

In other features, the first set of operations includes logic operations. The logic operations include at least one logic operation from a group consisting of AND, OR, XOR and NOT.

In other features, the second set of operations include logic operations. The logic operations include at least one logic operation from a group consisting of AND, OR, XOR and NOT.

In still other features, the first set of operations include comparison operations. The comparison operations include at least one comparison operation from a group consisting of equal to ($=$), not equal to ($\neq$), less than ($<$), less than or equal to ($\leq$), greater than ($>$) and greater than or equal to ($\geq$).

In yet other features, the second set of operations include comparison operations. The comparison operations include at least one comparison operation from a group consisting of equal to ($=$), not equal to ($\neq$), less than ($<$), less than or equal to ($\leq$), greater than ($>$) and greater than or equal to ($\geq$).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
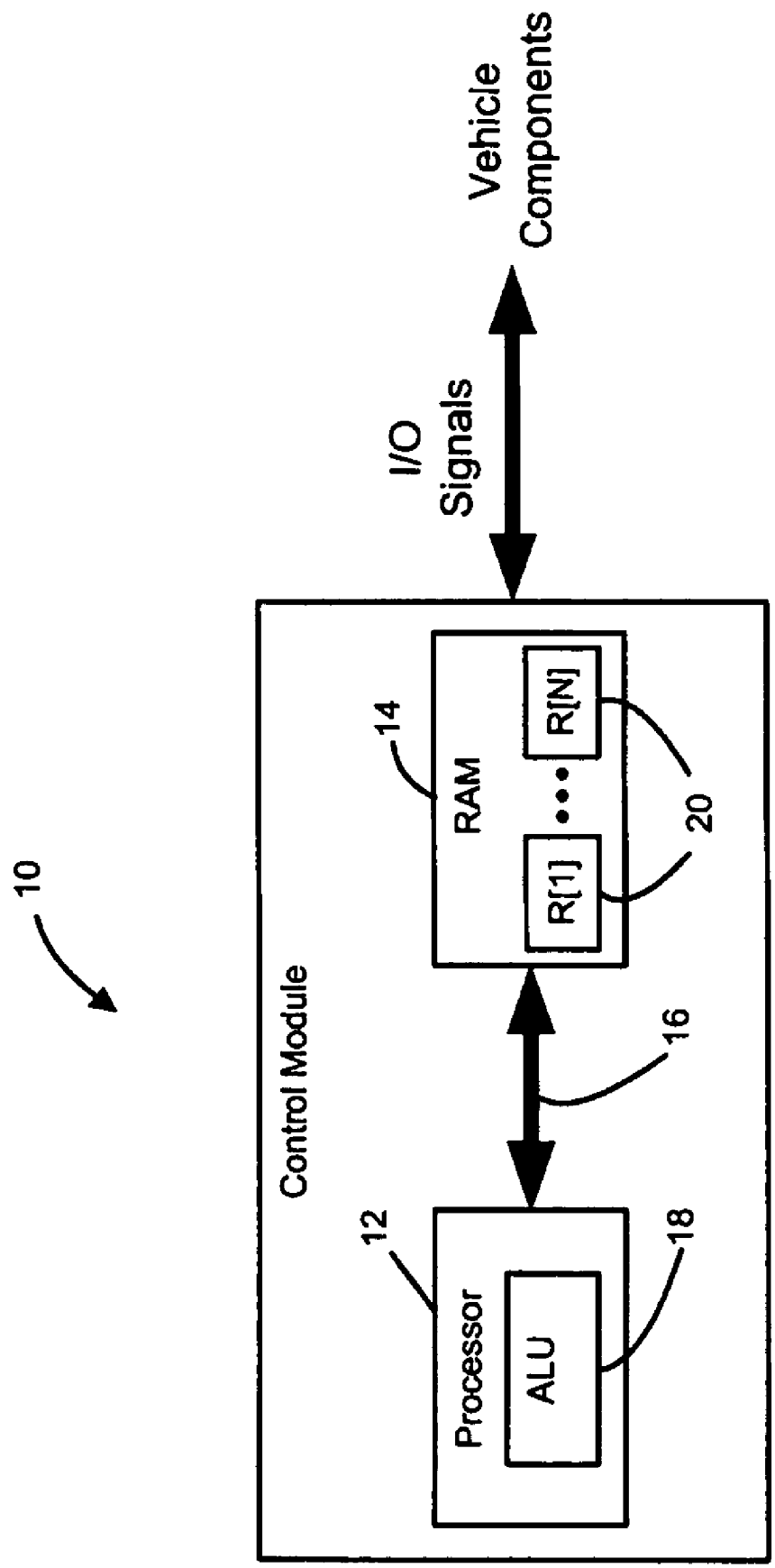
FIG. 1 is a schematic illustration of a control module that includes a processor having an arithmetic logic unit (ALU)

The following description of the preferred embodiment is merely exemplary in nature and is in no way intended to limit the invention, its application, or uses. For purposes of clarity, the same reference numbers will be used in the drawings to identify similar elements. As used herein, the term operation refers to comparison operations and logic operations. Comparison operations include, but are not limited to, equal to ($=$), not equal to ($\neq$), less than ($<$), less than or equal to ($\leq$), greater than ($>$) and greater than or equal to ($\geq$). Logic operations include, but are not limited to, AND, OR, XOR and NOT.

Referring now to FIG. 1, an exemplary control module 10 is schematically illustrated. The control module includes a processor 12, random access memory (RAM) 14 and a data link 16 that enables communications between the processor 12 and the RAM 14. The processor 12 includes an algorithmic logic unit (ALU) 18 and the RAM includes data storage registers 20 ($R_1$ to $R_N$). Although the data storage registers 20 are illustrated as part of the RAM 14, it is appreciated that the location of the data storage registers 20 can vary based on the particular control module architecture. The number of registers 20 can vary and the number of storage bits per register can vary.

The ALU 18 controls the transfer of data to and from the registers 20 and manipulates the data stored within the registers 20. More particularly, the ALU 18 performs calculations using the stored data to determine control signals for operating a system, such as a vehicle system. Some of the calculations performed by the ALU 18 are considered safety-critical. Therefore, proper functioning of the ALU 18 is necessary to ensure the resultant control signals safely operate system components. For example, in a vehicle having a shift-by-wire system, the control module 10 generates control signals that regulate shifting of a transmission. A defective ALU 18 may generate incorrect control signals for the current vehicle operating conditions. As a result, components of the transmission may be damaged and/or the transmission may improperly function.

The ALU integrity checks of the present invention determine whether all logic functions and tests performed by the ALU 18 are accurate, thereby ensuring the integrity of the ALU 18. It is appreciated that not all of the ALU integrity checks need be performed for a particular control module 10. For example, if the control module 10 does not execute all of the logic functions and tests, only the ALU integrity checks that correspond to the logic functions and tests is does perform. The ALU integrity checks are periodically executed by the control module 10 and can run based on a standard processing loop or intermittently between processing loops. One ALU integrity check evaluates the comparison operations performed by the ALU including, but not limited to, equal to (=), not equal to (≠), less than (<), less than or equal to (≦), greater than (>) and greater than or equal to (≧). Another ALU integrity check evaluates the logic operations performed by the ALU including, but not limited to, AND, OR, XOR and NOT.

The ALU integrity checks of the present invention use test values that are stored in the registers 20. Comparison and logic operations are performed on the test values. If the results of the operations are valid, the registers 20 and the ALU 18 are deemed to be operating properly. If a result of the operations is invalid, the specific register 20 and/or the ALU 18 are deemed to be operating improperly and remedial action is taken. The type of remedial action may vary based on system type (e.g., engine control, transmission control and the like). For example, in the case of an engine control system, the remedial action can include, but is not limited to, shutting down the engine or limiting engine speed. In the case of a transmission control system, the remedial action can include, but is not limited to, holding the transmission in park or limiting the gears available. Other remedial actions are also anticipated including, but not limited to, initiating a visual and/or audible fault indicator.

The ALU 18 performs signed and unsigned operations on the test values. A byte can take values of 0 to 255, which is $00 to $FF in hexadecimal (hex) or 0000 0000 to 111 1111 in binary. In unsigned operations, the values of the byte are interpreted as integers 0 to 255. In typical signed operations, called 2's complement, the left most bit indicates the sign. For example, 0 indicates a positive number and 1 indicates a negative number. As a result, the byte values $00 to $7F (i.e., 0000 0000 to 0111 1111) are integer values 0 to 127. Alternatively, the byte values $FF to $80 (i.e., 1111 1111 to 1000 0000) are integer values −1 to −128. Although the ALU check discussed in detail below are designed for 2's complement operations, each can be modified by those skilled in the art for other representations of negative numbers (e.g., 1's complement).

The exemplary test values implemented in the foregoing discussion include $AAAA and $5555, each comprised of 2-bytes, $AA and $55, respectively. The hex value $AA (i.e., 1010 1010) is equal to 170 unsigned and −86 signed. The hex value $5555 (i.e., 0101 0101) is equal to 85 signed and unsigned. Therefore, $AA is greater than $55 (i.e., 170>85) for unsigned operations and $AA is less than $55 (i.e., −86<85) for signed operations. It should also be noted that $AAAA has an opposite bit pattern as $5555. It is appreciated, that the test values and the number of bytes thereof are exemplary in nature. More particularly, the exemplary test values each include 2-bytes consisting of 16-bits. The test values can be larger or smaller based upon the size of the registers. For example, if each register can store only 1-byte, the test values $AA and $55 can be used. If each register can store 3-bytes, the test values $AAAAAA and $555555 can be used.

Figure 2:
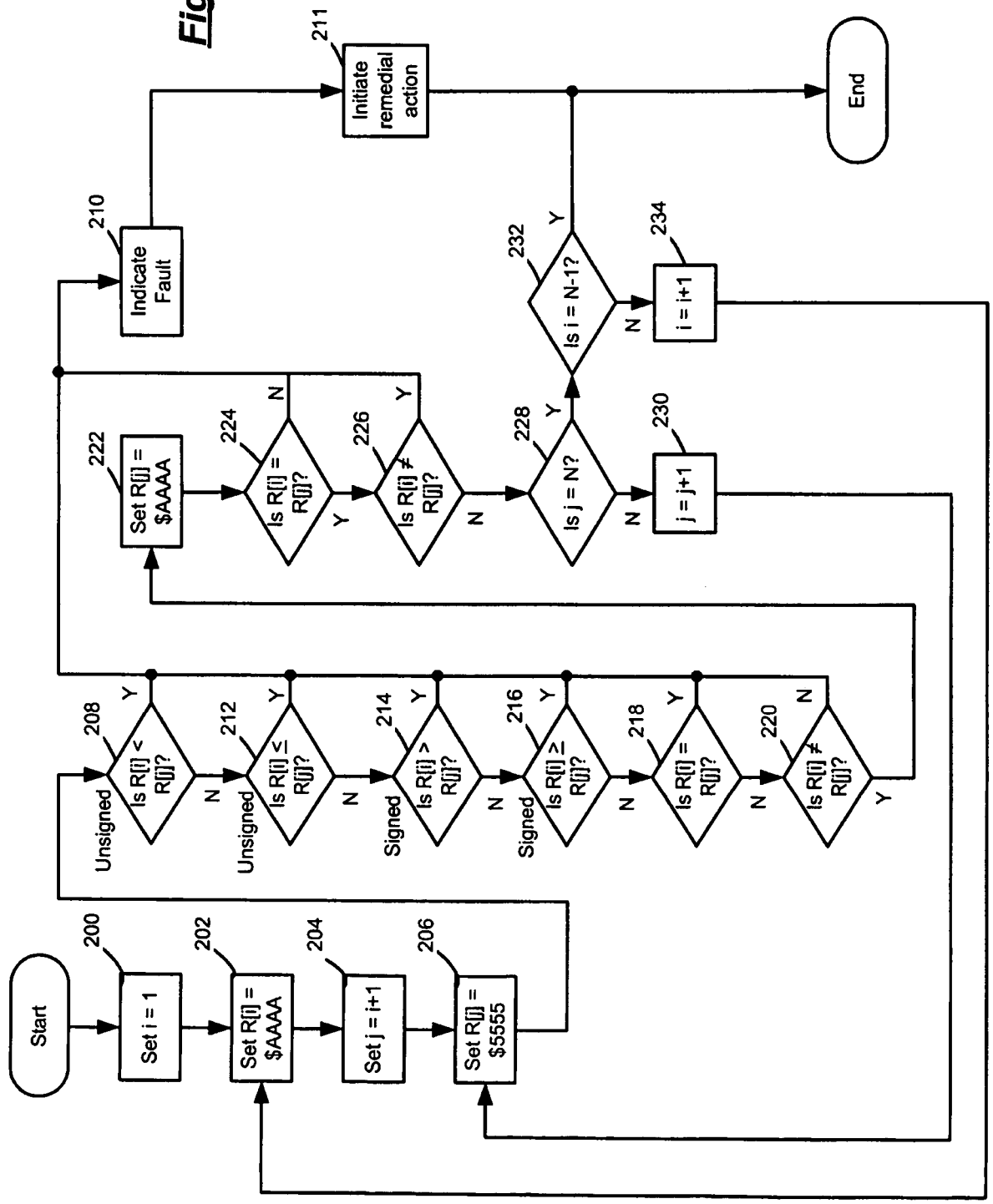
FIG. 2 is a flowchart illustrating a comparison integrity check for the ALU.

Referring now to FIG. 2, an ALU comparison check ensures the integrity of the ALU 18 with respect to comparison operations. In step 200, i is set equal to 1. In step 202, the hex test value $AAAA is stored in register R[i]. In step 204, j is set equal to i+1. The hex test value $5555 is stored in register R[j] in step 206. In step 208, the ALU check determines whether R[i]. is less than R[j] using an unsigned operation. If R[i] is less than R[j], a fault is indicated in step 210. If R[i] is not less than R[j], the ALU check determines whether R[i] is less than or equal to R[j] using an unsigned operation in step 212. If R[i] is less than or equal to R[j], a fault is indicated in step 210. If R[i] is not less than or equal to R[j], the ALU check continues in step 214. In step 211, remedial action is initiated and the ALU check ends.

In step 214, the ALU check determines whether R[i] is greater than R[j] using a signed operation. If R[i] is greater than R[j], a fault is indicated in step 210. If R[i] is not greater than R[j], the ALU check determines whether R[i] is greater than or equal to R[j] using a signed operation in step 216. If R[i] is greater than or equal to R[j], a fault is indicated in step 210. If R[i] is not greater than or equal to R[j], the ALU check continues in step 218. In step 218, the ALU check determines whether R[i] is equal to R[j]. If R[i] is equal to R[j], a fault is indicated in step 210. If R[i] is not equal to R[j], the ALU check determines whether R[i] is not equal to R[j] in step 220. If R[i] is equal to R[j], a fault is indicated in step 210. If R[i] is not equal to R[j], R[j] is set equal to $AAAA in step 222. In step 224, the ALU check determines whether R[i] is equal to R[j]. If R[i] is not equal to R[j], a fault is indicated in step 210. If R[i] is equal to R[j], the ALU check determines whether R[i] is not equal to R[j] in step 226. If R[i] is not equal to R[j], a fault is indicated in step 210. If R[i] is equal to R[j], the ALU check continues in step 228.

In step 228, the ALU check determines whether j is equal to N. If j is not equal to N, j is incremented by 1 and the ALU check loops back to step 206. In this manner, the ALU check is performed between R[i] and all of the other registers above R[i] (i.e., R[i+1] to R[N]). If j is equal to N, the ALU check determines whether i is equal to N−1 in step 232. If i is not equal to N−1, i is incremented by 1 in step 234 and the ALU check loops back to step 202. In this manner, the ALU check is performed between all of the registers. If i is equal to N−1, all of the registers have been checked and the ALU check ends.

Figure 3:
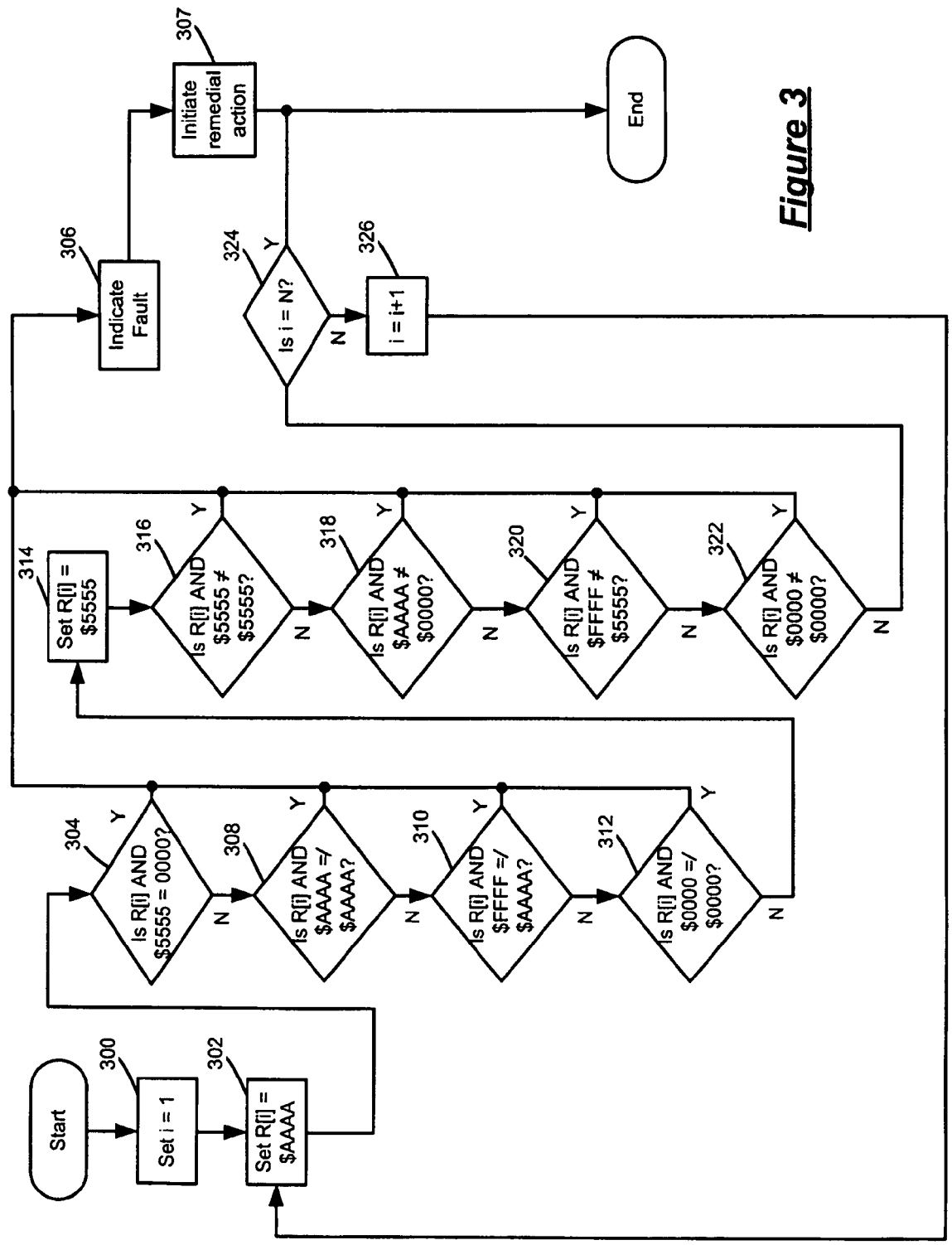
FIG. 3 is a flowchart illustrating an AND logic integrity check for the ALU.

Referring now to FIG. 3, an ALU logic check ensures the integrity of the ALU 18 with respect to the AND logic operation. In step 300, the i is set equal to 1. In step 302, the ALU check stores $AAAA in R[i]. In step 304, the ALU check determines whether R[i] AND $5555 is not equal to $0000. If R[i] AND $5555 is not equal to $0000, a fault is indicated in step 306. If R[i] AND $5555 is equal to $0000, the ALU check determines whether R[i] AND $AAAA is not equal to $AAAA in step 308. If R[i] AND $AAAA is not equal to $AAAA, a fault is indicated in step 306. If R[i] AND $AAAA is equal to $AAAA, the ALU check determines whether R[i] AND $FFFF is not equal to $AAAA in step 310. If R[i] AND $FFFF is not equal to $AAAA, a fault is indicated in step 306 and remedial action is initiated in step 307. If R[i] AND $FFFF is equal to $AAAA, the ALU check determines whether R[i] AND $0000 is not equal to $0000 in step 312. If R[i] AND $0000 is not equal to $0000, a fault is indicated in step 306. If R[i] AND $0000 is equal to $0000, the ALU check continues in step 314.

In step 314, the ALU check stores $5555 in R[i]. In step 316, the ALU check determines whether R[i] AND $5555 is not equal to $5555. If R[i] AND $5555 is not equal to $5555, a fault is indicated in step 306. If R[i] AND $5555 is equal to $5555, the ALU check determines whether R[i] AND $AAAA is not equal to $0000 in step 318. If R[i] AND $AAAA is not equal to $0000, a fault is indicated in step 306. If R[i] AND $AAAA is equal to $0000, the ALU check determines whether R[i] AND $FFFF is not equal to $5555 in step 320. If R[i] AND $FFFF is not equal to $5555, a fault is indicated in step 306. If R[i] AND $FFFF is equal to $5555, the ALU check determines whether R[i] AND $0000 is not equal to $0000 in step 322. If R[i] AND $0000 is not equal to $0000, a fault is indicated in step 306. If R[i] AND $0000 is equal to $0000, the ALU check continues determines whether i is equal to N in step 324. If i is not equal to N, i is incremented by 1 in step 326 and the ALU check loops back to step 302. If i is equal to N, the ALU check ends.

Figure 4:
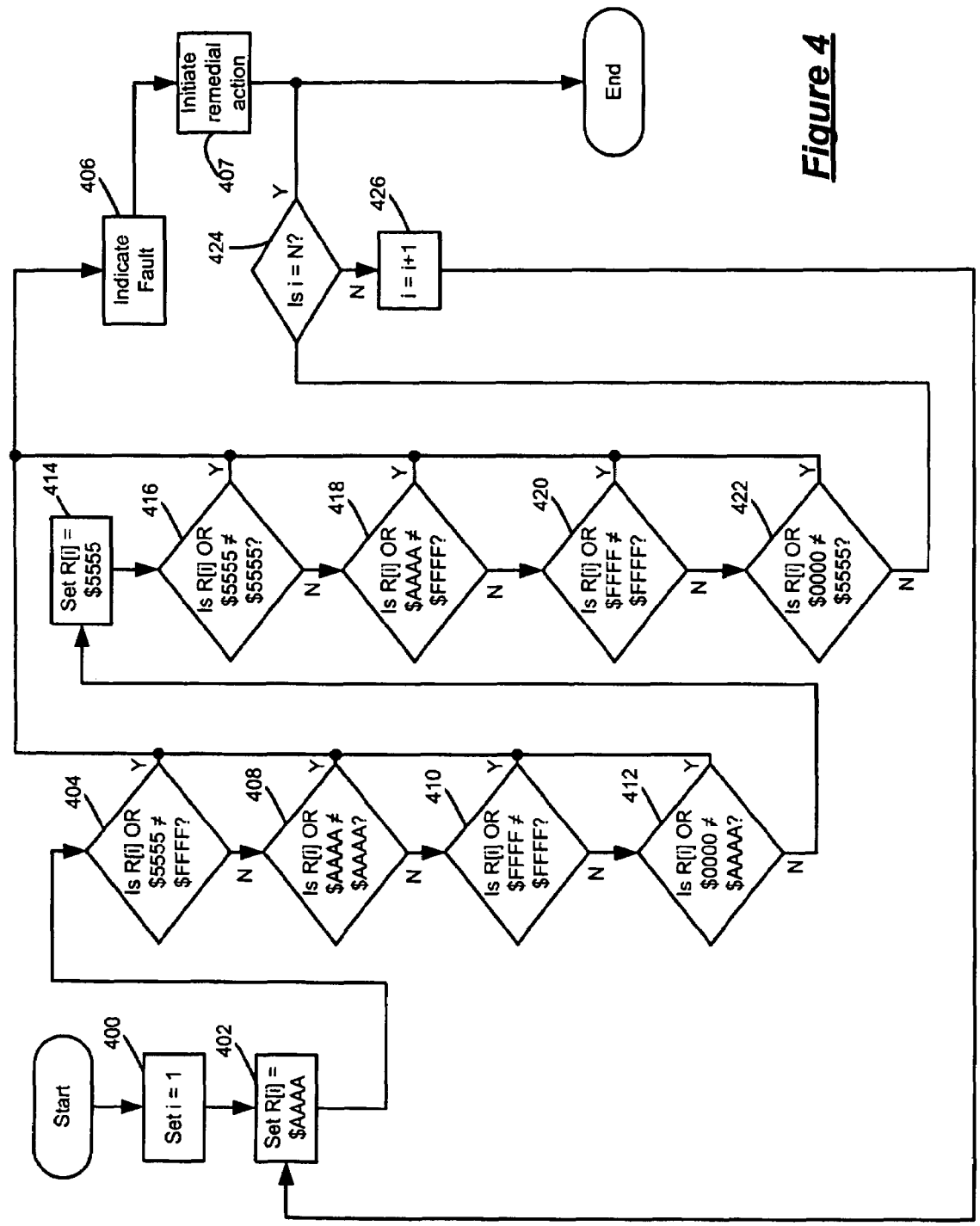
FIG. 4 is a flowchart illustrating an OR logic integrity check for the ALU.

Referring now to FIG. 4, an ALU logic check ensures the integrity of the ALU 18 with respect to the OR logic operation. In step 400, the i is set equal to 1. In step 402, the ALU check stores $AAAA in R[i]. In step 404, the ALU check determines whether R[i] OR $5555 is not equal to $FFFF. If R[i] OR $5555 is not equal to $FFFF, a fault is indicated in step 406, remedial action is initiated in step 407 and the ALU check ends. If R[i] OR $5555 is equal to $FFFF, the ALU check determines whether R[i] OR $AAAA is not equal to $AAAA in step 408. If R[i] OR $AAAA is not equal to $AAAA, a fault is indicated in step 406. If R[i] OR $AAAA is equal to $AAAA, the ALU check determines whether R[i] OR $FFFF is not equal to $FFFF in step 410. If R[i] OR $FFFF is not equal to $FFFF, a fault is indicated in step 406. If R[i] OR $FFFF is equal to $FFFF, the ALU check determines whether R[i] OR $0000 is not equal to $AAAA in step 412. If R[i] OR $0000 is not equal to $AAAA, a fault is indicated in step 406. If R[i] OR $0000 is equal to $AAAA, the ALU check continues in step 414.

In step 414, the ALU check stores $5555 in R[i]. In step 416, the ALU check determines whether R[i] OR $5555 is not equal to $5555. If R[i] OR $5555 is not equal to $5555, a fault is indicated in step 406. If R[i] OR $5555 is equal to $5555, the ALU check determines whether R[i] OR $AAAA is not equal to $FFFF in step 418. If R[i] OR $AAAA is not equal to $FFFF, a fault is indicated in step 406. If R[i] OR $AAAA is equal to $FFFF, the ALU check determines whether R[i] OR $FFFF is not equal to $FFFF in step 420. If R[i] OR $FFFF is not equal to $FFFF, a fault is indicated in step 406. If R[i] OR $FFFF is equal to $FFFF, the ALU check determines whether R[i]. OR $0000 is not equal to $5555 in step 422. If R[i] OR $0000 is not equal to $5555, a fault is indicated in step 406. If R[i] OR $0000 is equal to $5555, the ALU check determines whether i is equal to N in step 424. If i is not equal to N, i is incremented by 1 in step 426 and the ALU check loops back to step 402. If i is equal to N, the ALU check ends.

Figure 5:
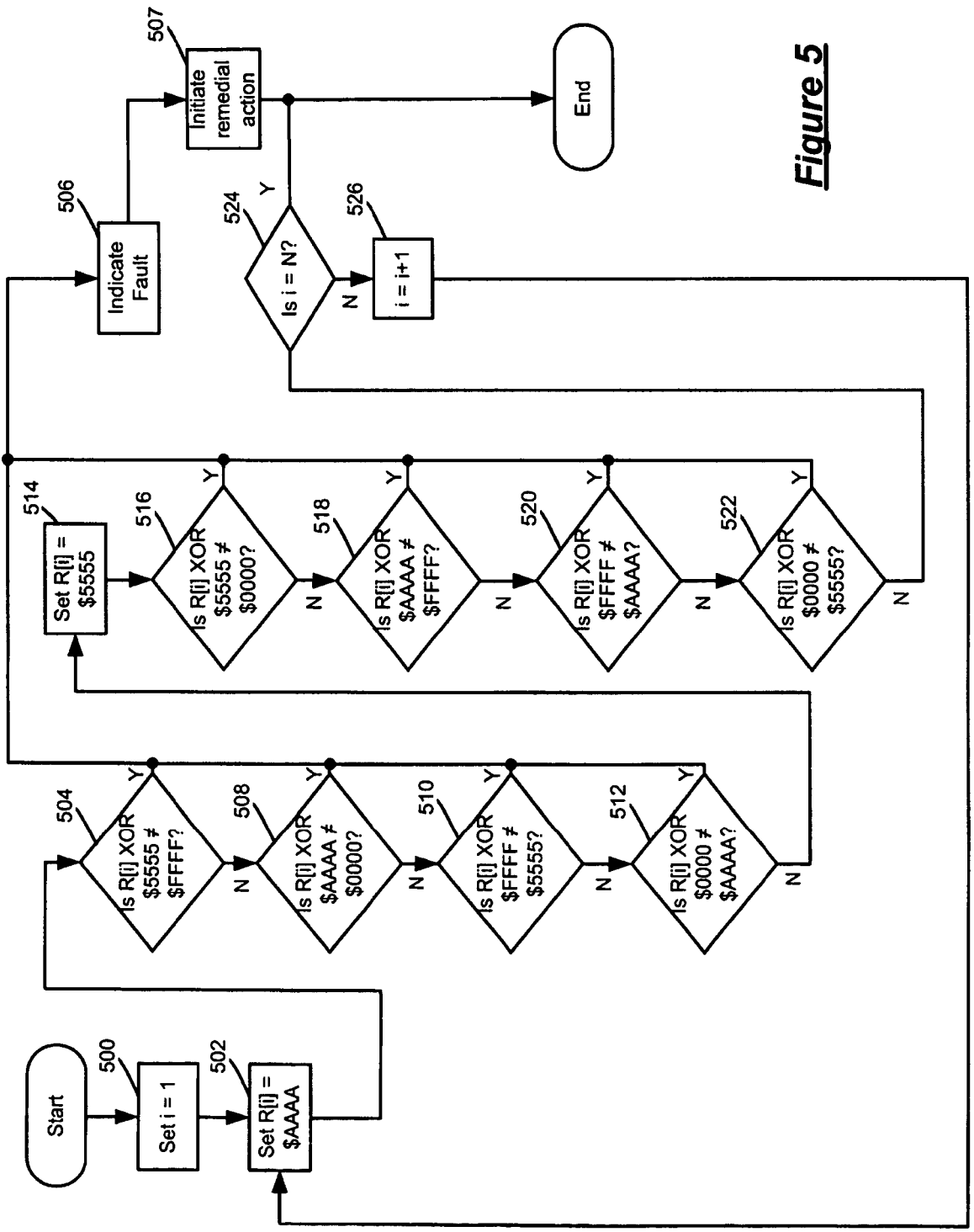
FIG. 5 is a flowchart illustrating an XOR logic integrity check for the ALU.

Referring now to FIG. 5, an ALU logic check ensures the integrity of the ALU 18 with respect to the XOR logic operation. In step 500, the i is set equal to 1. In step 502, the ALU check stores $AAAA in R[i]. In step 504, the ALU check determines whether R[i] XOR $5555 is not equal to $FFFF. If R[i] XOR $5555 is not equal to $FFFF, a fault is indicated in step 506, remedial action is initiated in step 507 and the ALU check ends. If R[i] XOR $5555 is equal to $FFFF, the ALU check determines whether R[i] XOR $AAAA is not equal to $0000 in step 508. If R[i] XOR $AAAA is not equal to $0000, a fault is indicated in step 506. If R[i] XOR $AAAA is equal to $0000, the ALU check determines whether R[i] XOR $FFFF is not equal to $5555 in step 510. If R[i] XOR $FFFF is not equal to $5555, a fault is indicated in step 506. If R[i] XOR $FFFF is equal to $5555, the ALU check determines whether R[i] XOR $0000 is not equal to $AAAA in step 512. If R[i] XOR $0000 is not equal to $AAAA, a fault is indicated in step 506. If R[i] XOR $0000 is equal to $AAAA, the ALU check continues in step 514.

In step 514, R[i] the ALU check stores $5555 in R[i]. In step 516, the ALU check determines whether R[i] XOR $5555 is not equal to $0000. If R[i] XOR $5555 is not equal to $0000, a fault is indicated in step 506. If R[i] XOR $5555 is equal to $0000, the ALU check determines whether R[i] XOR $AAAA is not equal to $FFFF in step 518. If R[i] XOR $AAAA is not equal to $FFFF, a fault is indicated in step 506. If R[i] XOR $AAAA is equal to $FFFF, the ALU check determines whether R[i] XOR $FFFF is not equal to $AAAA in step 520. If R[i] XOR $FFFF is not equal to $AAAA, a fault is indicated in step 506. If R[i] XOR $FFFF is equal to $AAAA, the ALU check determines whether R[i] XOR $0000 is not equal to $5555 in step 522. If R[i] XOR $0000 is not equal to $5555, a fault is indicated in step 506. If R[i] XOR $0000 is equal to $5555, the ALU check determines whether i is equal to N in step 524. If i is not equal to N, i is incremented by 1 in step 526 and the ALU check loops back to step 502. If i is equal to N, the ALU check ends.

Figure 6:
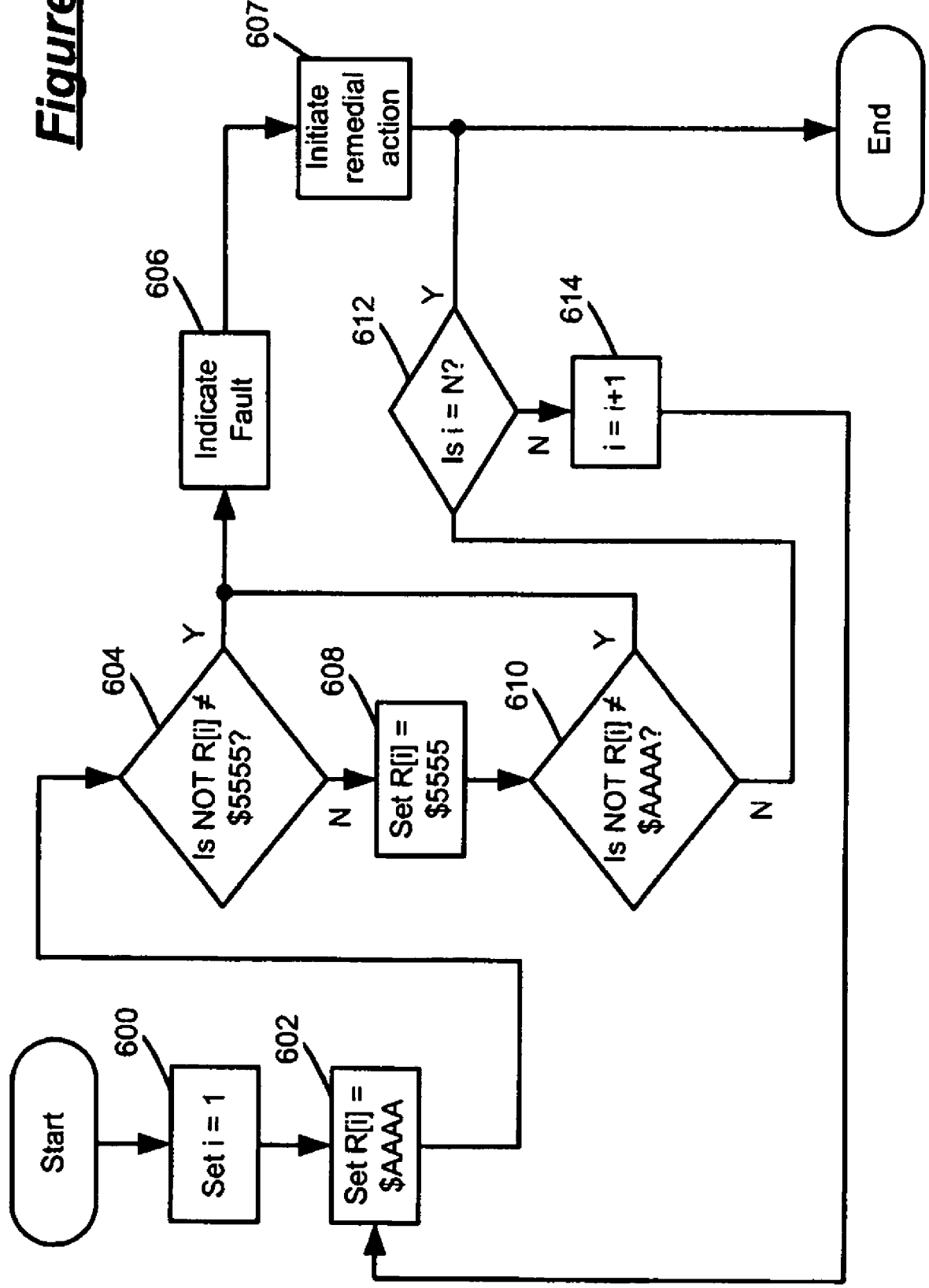
FIG. 6 is a flowchart illustrating a NOT logic integrity check for the ALU.

Referring now to FIG. 6, an ALU logic check ensures the integrity of the ALU 18 with respect to the NOT logic operation. In step 600, the ALU check sets i equal to 1. In step 602, the ALU check stores $AAAA in R[i]. In step 604, the ALU check determines whether NOT R[i] is not equal to $5555. If NOT R[i] is not equal to $5555, a fault is indicated in step 606, remedial action is initiated in step 607 and the ALU check ends. If NOT R[i] is equal to $5555, $5555 is stored in R[i] in step 608. In step 610, the ALU check determines whether NOT R[i] is not equal to $AAAA. If NOT R[i] is not equal to $AAAA, a fault is indicated in step 606. If NOT R[i] is equal to $AAAA the ALU check continues in step 612. In step 612, the ALU check determines whether i is equal to N. If i is not equal to N, i is incremented by 1 in step 614 and the ALU check loops back to step 602. If i is equal to N, the ALU check ends.

Figure 7A:
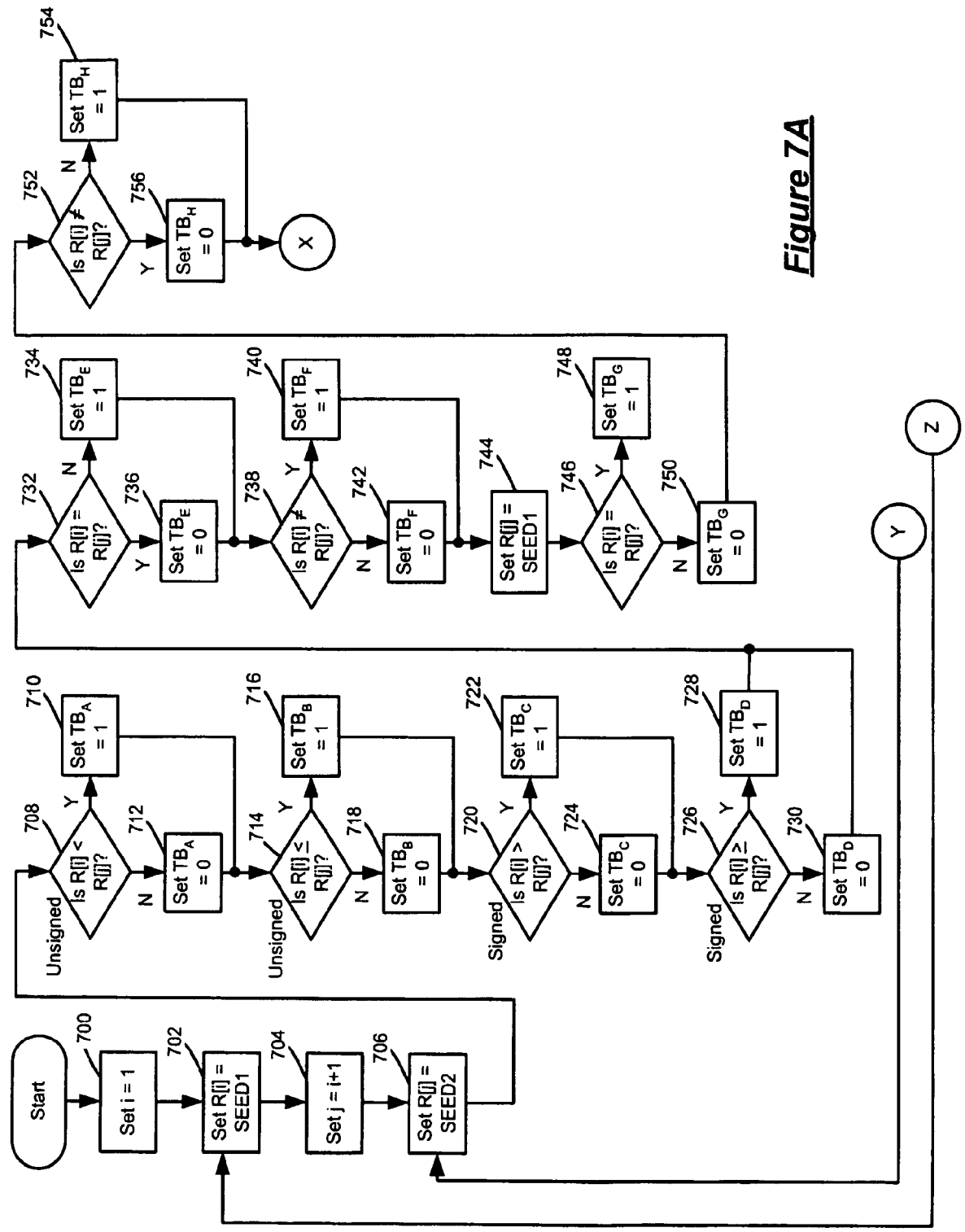
FIG. 7A is a flowchart illustrating a first portion of an exemplary seed and key based ALU check for comparison operations according to the present invention.
Figure 7B:
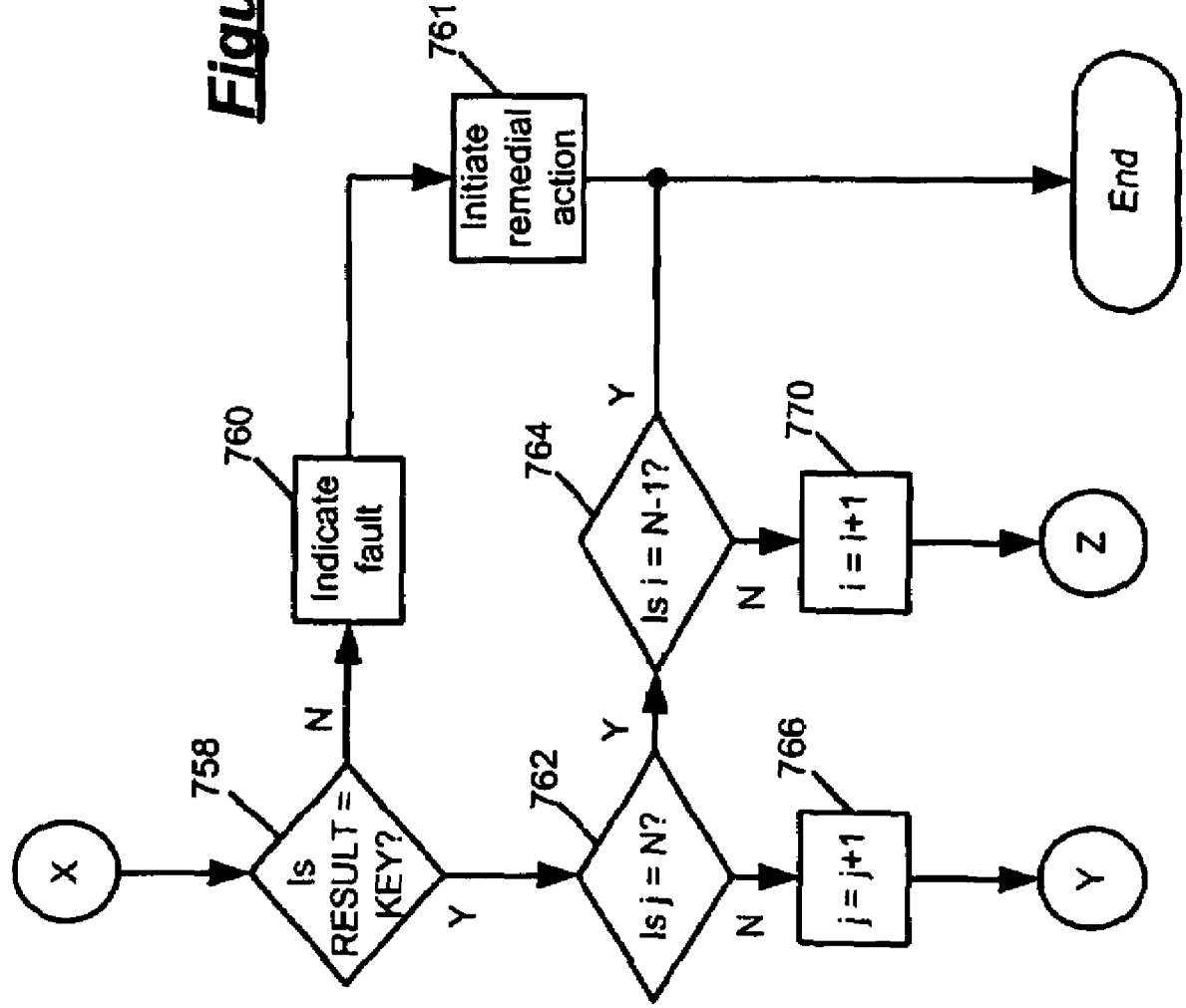
FIG. 7B is a flowchart illustrating a second portion of the exemplary seed and key based ALU check for comparison operations according to the present invention.

Referring now to FIGS. 7A and 7B, a seed and key check can be developed based on the ALU checks described above. It is appreciated that a second processor can be implemented to generate the seeds and verify the key, as explained in further detail below. FIGS. 7A and 7B illustrate an exemplary seed and key based ALU check developed for the comparison operations. The exemplary test values (e.g., $AAAA and $5555) are replaced by two seed values, SEED1 and SEED2, respectively. The key is an expected value. The ALU check performs comparison operations between SEED1 and SEED2 and assigns a value to individual bits of a result value (RESULT) for each comparison operation performed. The exemplary ALU check of FIGS. 7A and 7B include eight comparison operations. Therefore, RESULT for the exemplary ALU check includes 8-bits, $B_A$ through $B_H$. If each of the comparison operations is valid, $B_A$ through $B_H$ are each equal to 1 and RESULT is equal to 1111 1111. In this case, KEY would also be equal to 1111 1111, and no fault would be indicated because RESULT is equal to KEY. If any of the comparison operations is invalid, one or more of the bits $B_A$ through $B_H$ will be equal to 0 and RESULT will include a 0. Because RESULT includes a 0, RESULT is not equal to KEY, which includes all 1's, and a fault is indicated.

With particular reference to FIG. 7A, i is set equal to 1 in step 700. In step 702, SEED1 is stored in R[i]. In step 704, j is set equal to i+1. SEED2 is stored in R[j] in step 706. In step 708, the ALU check determines whether R[i] is less than R[j] using an unsigned operation. If R[i] is less than R[j], the comparison operation is deemed valid and $B_A$ is set equal to 1 in step 710. If R[i] is not less than R[j], the comparison operation is deemed invalid and $B_A$ is set equal to 0 in step 712. In step 714, the ALU check determines whether R[i] is less than or equal to R[j] using an unsigned operation. If R[i] is less than or equal to R[j], the comparison operation is deemed valid and BB is set equal to 1 in step 716. If R[i] is not less than or equal to R[j], the comparison operation is deemed invalid and BB is set equal to 0 in step 718.

In step 720, the ALU check determines whether R[i] is greater than R[j] using a signed operation. If R[i] is greater than R[j], the comparison operation is deemed valid and Bc is set equal to 1 in step 722. If R[i] is not greater than R[j], the comparison operation is deemed invalid and Bc is set equal to 0 in step 724. In step 726, the ALU check determines whether R[i] is greater than or equal to R[j] using a signed operation. If R[i] is greater than or equal to R[j], the comparison operation is deemed valid and BD is set equal to 1 in step 728. If R[i] is not greater than or equal to R[j], the comparison operation is deemed invalid and BD is set equal to 0 in step 730.

In step 732, the ALU check determines whether R[i] is equal to R[j]. If R[i] is not equal to R[j], the comparison operation is deemed invalid and BE is set equal to 1 in step 734. If R[i] is equal to R[j], the comparison operation is deemed valid and BE is set equal to 0 in step 736. In step 738, the ALU check determines whether R[i] is not equal to R[j]. If R[i] is not equal to R[j], the comparison operation is deemed valid and BF is set equal to 1 in step 740. If R[i] is equal to R[j], the comparison operation is deemed invalid and BF is set equal to 0 in step 742.

SEED1 is stored in R[j] in step 744. In step 746, the ALU check determines whether R[i] is equal to R[j]. If R[i] is equal to R[j], the comparison operation is deemed valid and $B_G$ is set equal to 1 in step 748. If R[i] is not equal to R[j], the comparison operation is deemed invalid and $B_G$ is set equal to 0 in step 750. In step 752, the ALU check determines whether R[i] is not equal to R[j]. If R[i] is equal to R[j], the comparison operation is deemed valid and $B_H$ is set equal to 1 in step 754. If R[i] is not equal to R[j], the comparison operation is deemed invalid and $B_H$ is set equal to 0 in step 756. From this point, the flowchart continues at point X in FIG. 7B.

In step 758, the ALU check determines whether RESULT is equal to KEY. If RESULT is not equal to KEY, a fault is indicated in step 760, remedial action is initiated in step 761 and the ALU check ends. If RESULT is equal to KEY, the ALU check determines whether j is equal to N in step 762. If j is equal to N, the ALU check continues in step 764. If j is not equal to N, j is incremented by 1 in step 766 and the ALU check continues at point Y in FIG. 7A, looping back to step 706. In step 764, the ALU check determines whether i is equal to N−1. If i is equal to N−1, the ALU check ends. If i is not equal to N−1, i is incremented by 1 in step 770 and the ALU check continues at point Z in FIG. 7A, looping back to step 702.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of validating operation of an arithmetic logic unit (ALU) of a vehicle control module, comprising:
    inputting a first test value into one of N registers of said ALU, where N is an integer greater than 2;
    inputting a second test value into remaining registers of said N registers;
    performing a first set of operations between said one of said N registers and each of said remaining registers to produce a corresponding first set of results;
    indicating a fault when one of said first set of results varies from a first predetermined result;
    inputting said first test value into said remaining registers;
    performing a second set of operations between said one of N registers and each of said remaining registers to produce a corresponding second set of results; and
    indicating a fault when one of said second set of results varies from a second predetermined result.

2. The method of claim 1 wherein said first set of operations include logic operations.

3. The method of claim 2 wherein said logic operations include at least one logic operation from a group consisting of AND, OR, XOR and NOT.

4. The method of claim 1 wherein said second set of operations include logic operations.

5. The method of claim 4 wherein said logic operations include at least one logic operation from a group consisting of AND, OR, XOR and NOT.

6. The method of claim 1 wherein said first set of operations include comparison operations.

7. The method of claim 6 wherein said comparison operations include at least one comparison operation from a group consisting of equal to (=), not equal to (≠), less than (<), less than or equal to (≦), greater than (>) and greater than or equal to (≧).

8. The method of claim 1 wherein said second set of operations include comparison operations.

9. The method of claim 8 wherein said comparison operations include at least one comparison operation from a group consisting of equal to (=), not equal to (≠), less than (<), less than or equal to (≦), greater than (>) and greater than or equal to (≧).

10. The method of claim 1 comprising indicating a fault of one of said N registers within a vehicle,
    wherein said N registers store values generated from vehicle sensors.

11. The method of claim 1 comprising:
    indicating a fault with at least one of said N registers; and
    regulating shifting of a transmission of a shift-by-wire system,
    wherein said N registers store values generated from vehicle sensors.

12. The method of claim 1 comprising taking a remedial action selected from at least one of adjusting engine speed, altering engine operation, holding a transmission in park, and limiting gears available based on said fault.

13. The method of claim 1 further comprising:
    comparing said first set of results to said first predetermined result; and validating operation of a processor of the ALU based on said comparing.

14. The method of claim 1 further comprising:
comparing said first set of results to said first predetermined result; and
validating operation of said one of said N registers based on said comparing.

15. The method of claim 14 comprising validating each of said N registers based on said comparing.

16. The method of claim 1 further comprising:
comparing said second set of results to said second predetermined result; and
validating operation of a processor of the ALU based on said comparing.

17. The method of claim 1 further comprising:
comparing said second set of results to said second predetermined result; and
validating operation of said one of said N registers based on said comparing.

18. A method of validating an operational integrity of a vehicle control module that includes i through N registers, comprising:
inputting a first test value into register i;
inputting a second test value into registers i+1 through register N, where N is an integer greater than 2;
performing a first set of operations between register i and each of registers i+1 through N to produce a first set of results;
indicating a fault when one of said first set of results varies from a first predetermined result;
incrementing i after performing said first set of operations to generate said first set of results; and
performing said first set of operations between said register i and each of registers i+1 through N to produce a second set of results after said incrementing,
wherein said first set of operations include at least one of AND, OR, less than (<), less than or equal to ($\leq$), greater than (>) and greater than or equal to ($\geq$).

19. The method of claim 18 further comprising:
inputting said first test value into said registers i+1 through N;
performing a second set of operations between register i and each of registers i+1 through N to produce said second set of results; and
indicating a fault when one of said second set of results varies from a second predetermined result.

20. The method of claim 19 wherein said second set of operations include logic operations.

21. The method of claim 20 wherein said logic operations include at least one logic operation from a group consisting of AND, OR, and XOR.

22. The method of claim 19 wherein said second set of operations include comparison operations.

23. The method of claim 22 wherein said comparison operations include at least one comparison operation from a group consisting of equal to (=), not equal to ($\neq$), less than (<), less than or equal to ($\leq$), and greater than or equal to ($\geq$).

24. A method of verifying the integrity of an arithmetic logic unit (ALU) of a vehicle control module that includes 1 through N registers, comprising:
inputting a first seed value into one of N registers of said ALU, where N is an integer greater than 2;
inputting a second seed value into remaining registers of said N registers;
performing a first set of operations between said one of said N registers and each of said remaining registers to produce a first set of results;
setting a respective bit of a result string based on each of said first set of results;
indicating a fault when said result string varies from a key;
inputting said first seed value into said remaining registers; and
performing a second set of operations between said one of said N registers and each of said remaining registers to produce a second set of results.

25. The method of claim 24 wherein said first set of operations include logic operations.

26. The method of claim 25 wherein said logic operations include at least one logic operation from a group consisting of AND, OR, and XOR.

27. The method of claim 24 wherein said second set of operations include logic operations.

28. The method of claim 27 wherein said logic operations include at least one logic operation from a group consisting of AND, OR, and XOR.

29. The method of claim 24 wherein said first set of operations include comparison operations.

30. The method of claim 29 wherein said comparison operations include at least one comparison operation from a group consisting of equal to (=), not equal to ($\neq$), less than (<), less than or equal to ($\leq$), greater than (>), and greater than or equal to ($\geq$).

31. The method of claim 24 wherein said second set of operations include comparison operations.

32. The method of claim 31 wherein said comparison operations include at least one comparison operation from a group consisting of equal to (=), not equal to ($\neq$), less than (<), less than or equal to ($\leq$), greater than (>), and greater than or equal to ($\geq$).

* * * * *

UNITED STATES PATENT AND TRADEMARK OFFICE
CERTIFICATE OF CORRECTION

PATENT NO.        : 7,600,161 B2                                    Page 1 of 1
APPLICATION NO.   : 10/918621
DATED             : October 6, 2009
INVENTOR(S)       : Costin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Fifth Day of October, 2010

David J. Kappos
*Director of the United States Patent and Trademark Office*